Patented Dec. 26, 1939

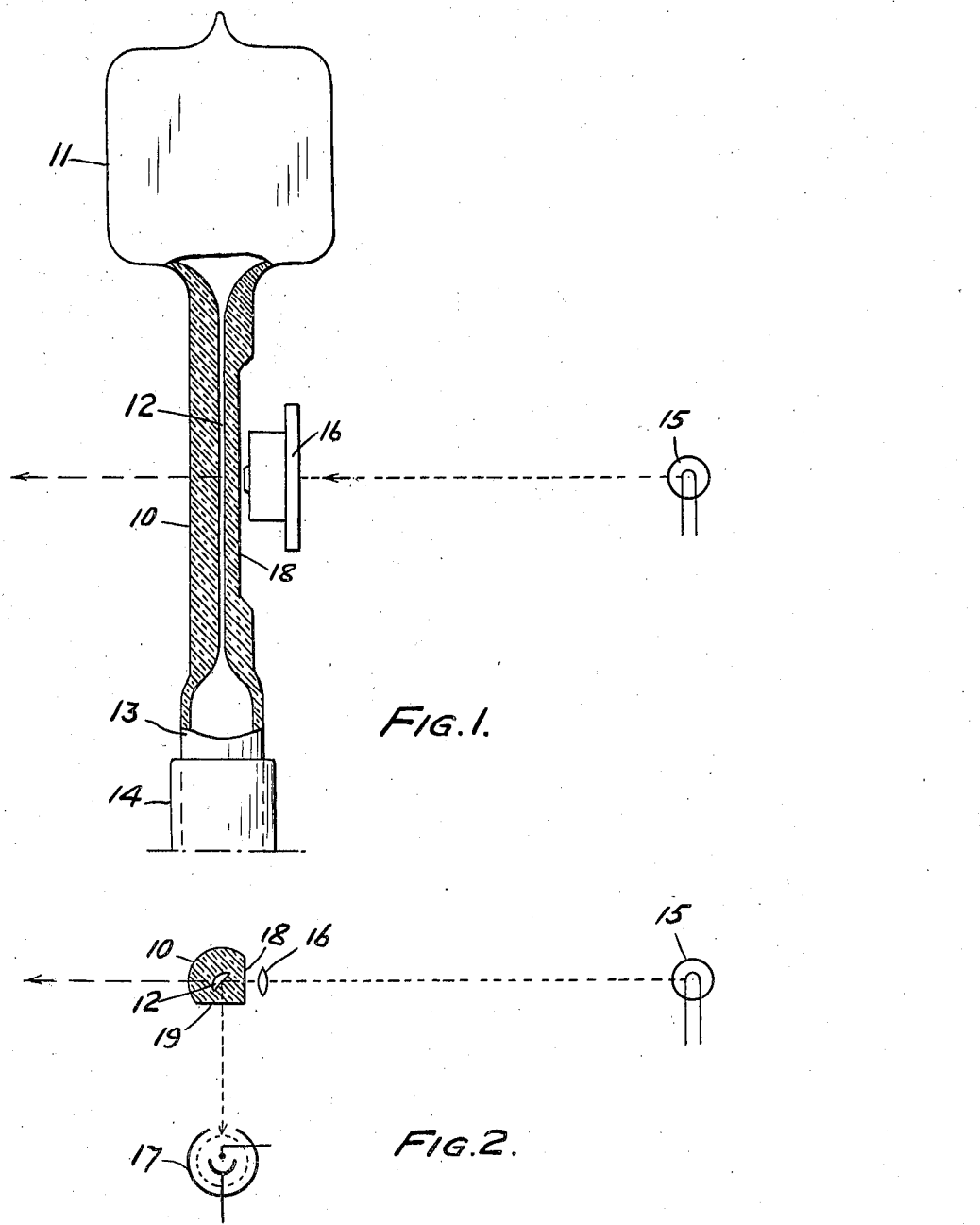

2,185,104

UNITED STATES PATENT OFFICE 2,185,104

TEMPERATURE CONTROL APPARATUS

Harry Heller, Ardmore, Pa., assignor to Sun Oil Company, a corporation of New Jersey Application July 27, 1939, Serial No. 286,753

2 Claims. (Cl. 250—41.5)

This invention relates to apparatus for temperature control, and more particularly to an apparatus in which the temperature control is effected by use of photoelectric means.

In order to secure accurate control of temperature, it has been proposed to cause a beam of light of quite small cross-section to be interrupted by the rise of a column of thermometric liquid so that, through the action of photoelectric apparatus on which the beam impinges, control of a heating appliance may be secured. Such apparatus, however, has not been satisfactory where extremely accurate control of temperature is necessary, by reason of the diffusion, diffraction and other effects occurring as the column of liquid intercepts the beam, which effects cause the existence of a substantial range of movement of the column of liquid in which indeterminate and somewhat erratic control by the photoelectric apparatus occurs.

It is a broad object of the present invention to provide a device of this character in which an extremely sharp cut-off of light with respect to the rise of the liquid column may be secured, so that temperatures may be controlled to an accuracy, for example, within .001° C. of a predetermined temperature.

The broad and more specific objects of the invention will become apparent from the following description, read in conjunction with the accompanying drawing, in which:

Figure 1 illustrates diagrammatically in partial section various parts of the apparatus which are of interest; and Figure 2 is a horizontal section taken through the beam of light.

There is indicated at 10 the tube of a thermometer surrounded by a top expansion bulb 11 and having a lower portion 13 communicating with a tube 14 which extends to a suitable bulb member immersed within a liquid or container the temperature of which is to be controlled to a high degree of accuracy. As illustrated in Figure 1, the tube 10 includes a capillary passage 12 of small cross-sectional area in which a very substantial rise of level will occur for a slight change of temperature of the thermometric liquid. Except for the cross-sectional shape of the bore 12, the entire thermometer arrangement just indicated may be of conventional type and need not be described in greater detail.

Referring particularly to Figure 2, there is illustrated therein the form which the capillary passage 12 and the walls of the tube 10 preferably takes. The capillary 12 of the tube is drawn in the form of a circular segment presenting preferably a plane surface, as indicated. At respective angles of 45° with respect to this plane surface, the exterior of the thermometer tube is ground and polished as indicated at 18 and 19. Adjacent the face 18, there is located a lens system, indicated at 16, adapted to project on the plan face of the capillary bore a minute spot of light which may be the image of a concentrated filament or incandescent point of a lamp 15. It will be evident that with a proper choice of lens system and source of light, the image projected on the plane surface of the capillary bore may be extremely small.

The thermometer is filled with a liquid, preferably toluene or xylene, having a large coefficient of expansion so as to give thermometric sensitivity and having an index of refraction closely approaching that of the glass of which the thermometer tube 10 is formed.

If the top of the liquid column is below the spot of light projected on the plane surface of the capillary, the rays forming the image will be totally reflected within the glass and will pass out through the ground surface 19 to impinge upon a photoelectric cell 17 which, through suitable amplifying means (if the photoelectric cell is such as to require amplification of its output) and relays will control the heating of the liquid or chamber the temperature of which is to be controlled. As the liquid rises in the capillary bore, and passes the position of the spot of light, the total reflection will no longer occur, but the light will pass directly through the liquid and from the tube, as indicated by the left hand arrow in Figure 2. Substantially no reflection whatever will now occur at the plane surface, and consequently no light will impinge on the photoelectric cell. The heating means will thereupon be deenergized.

It will be evident that this arrangement, by its elimination of diffusion and diffraction effects, provides an extremely sharp differentiation of the path of the light rays as the liquid rises to a light intercepting position.

It will be evident that various modifications within the scope of the invention may be made. The liquid used, for example, may be any one having a sufficiently high coefficient of expansion to give necessary sensitivity and having an index of refraction approaching sufficiently closely that of the glass used, so that the light when the capillary is filled with liquid will not strike the photoelectric cell. The precise cross-section of the capillary bore is also subject to variations. It may, for example, be drawn slightly curved so as to control the nature of the beam reflected to the photoelectric cell. The angles of the faces 18 and 19 with respect to the reflecting surface of the bore may also be freely varied. Desirably, however, as great a deviation as possible of the beam is obtained between the intercepting and non-intercepting positions of the liquid column.

What I claim and desire to protect by Letters Patent is:

1. A temperature control device comprising a light source, a thermometer tube having a bore therein, and a photoelectric cell, the bore of said tube having a light reflecting surface, and said light source and photoelectric cell being so located that when said tube does not have liquid therein at a point on which a beam from the light source is directed, total reflection of the beam upon the photoelectric cell occurs.

2. A temperature control device comprising a light source, a thermometer tube having a bore therein, and a photoelectric cell, the bore of said tube having a light reflecting surface, and said light source and photoelectric cell being so located that when said tube does not have liquid therein at a point on which a beam from the light source is directed, total reflection of the beam upon the photoelectric cell occurs, said thermometer tube containing a liquid having a refractive index substantially that of the glass of which the tube is formed.

HARRY HELLER.